(12) United States Patent
Dunn

(10) Patent No.: US 8,381,502 B2
(45) Date of Patent: Feb. 26, 2013

(54) CUT SIGHT GAUGE

(76) Inventor: Walter Dunn, Tipton, IN (US)

(*) Notice: Subject to any disclaimer, the term of this patent is extended or adjusted under 35 U.S.C. 154(b) by 37 days.

(21) Appl. No.: 13/153,714

(22) Filed: Jun. 6, 2011

(65) Prior Publication Data

US 2012/0304610 A1  Dec. 6, 2012

(51) Int. Cl.
*A01D 41/14* (2006.01)

(52) U.S. Cl. .......... 56/10.2 E; 56/15.8; 56/15.9; 56/17.1

(58) Field of Classification Search .......... 116/281–284, 116/303; 56/17.1, 17.2, 10.2 E, 15.8, 15.9
See application file for complete search history.

(56) References Cited

U.S. PATENT DOCUMENTS

| 1,513,680 | A | * | 10/1924 | Titterington | 116/282 |
| 3,349,747 | A | * | 10/1967 | Vande Wiele | 116/282 |
| 3,398,516 | A | * | 8/1968 | Quick | 56/208 |
| 3,967,437 | A | * | 7/1976 | Mott et al. | 56/10.2 R |
| 5,797,252 | A | * | 8/1998 | Goman | 56/17.2 |

* cited by examiner

*Primary Examiner* — Alicia Torres
(74) *Attorney, Agent, or Firm* — Eric R. Wandel

(57) ABSTRACT

A cut sight gauge for corn field production equipment used for detasseling operations where the cut sight gauge allows the operator to visually monitor the height of cutters and tassel pullers on corn crop cutting machines. The cut sight gauge ensures a uniform operating height of cut consistent with the optimum growing demands of the plants. The added safety advantage to the operator and the area supervisors who manage field operations are also a benefit for the field-specific set up applications as described herein.

5 Claims, 5 Drawing Sheets

CUT SIGHT GAUGE

BACKGROUND OF THE INVENTION

The present invention relates to the field of corn field production equipment used for detasseling operations. More specifically, the present invention is a cut sight gauge for providing an integrated means of monitoring the height of cutters and tassel pullers on corn crop cutting machines. The cut sight gauge ensures a uniform operating height of cut consistent with the optimum growing demands of the plants. The added safety advantage to the operator and the area supervisors who manage field operations are also a benefit for the field-specific set up applications as described herein.

Corn field production typically requires the removal of tassels from corn stalks to facilitate desired pollination in fields planted with multiple seed types for hybrid production. A detasseling machine is used to cut off the tops of corn stalks in one operation that levels the heights of the top of the stalks and facilitates the later removal of tassels by another operation 1 to 2 days later. It is important to maintain an optimal and consistent cutting height, which may vary by field and within a field of planted corn.

Usually only the top 2 to 3½ inches of the plants are cut off in the cutting operation. The reason for cutting off this portion of the plant is to let the tassel of the plant extend faster, so the tassel can be removed in the following 1 to 2 days before the plant produces pollen.

The current way the machine is set up in the field is for an area supervisor to use a hand held tape measure to determine the height of the cut and give a directional hand gesture to the operator to move the cutting head up or down to the correct operating position. A height check is taken by the same procedure periodically during the course of the operating day. In performing this task several times a day the risk of injury from electrical, hydraulic or communication failure increases. The time between cutting height check intervals could also result in a less than optimal height of the cutter/puller assembly and reduced overall quality.

A number of typical devices utilized in the operations of cutting and tassel pulling are described by the following U.S. patents.

U.S. Pat. No. 3,708,016 relates to a mechanism for lifting obstructing leaves from the path of a photo-electric light beam which is being propelled along and above a plant row for photo-electric thinning purposes. This patent does not disclose a visible metered gauge for setting and maintaining the height of the mechanism.

U.S. Pat. No. 3,710,564 relates to an apparatus for pulling tassels out of corn stalks, but does not disclose a visible metered gauge for setting and maintaining the height of the apparatus.

U.S. Pat. No. 3,724,184 relates to a detasseling device that improves upon the ability to adjust the pressure at the gripping surface but does not disclose a visible metered gauge for setting and maintaining the height of the apparatus.

U.S. Pat. No. 3,727,332 relates to a laser guidance system for grade control where a laser is used to maintain the level of the apparatus. No visible metered gauge for setting and maintaining the height of the apparatus is disclosed.

U.S. Pat. No. 3,736,730 relates to an apparatus for removing tassels and is directed toward improvements in the tassel pulling mechanism. No visible metered gauge for setting and maintaining the height of the apparatus is disclosed.

U.S. Pat. No. 3,769,782 relates to corn detasselers and discloses a hydraulic means of adjusting the detasseling height, but no visible metered gauge for setting and maintaining the height of the apparatus is disclosed.

U.S. Pat. No. 4,258,537 relates to a seed corn detasseling machine and discloses hydraulic means of adjusting the height of the apparatus, but no visible metered gauge for setting and maintaining the height of the apparatus is disclosed.

These and other prior art devices related to detasseling machines disclose pulling and cutting devices that are positioned relative to the tops of plants, such as corn stalks, by hydraulic or other means. While the means of adjusting the height has been provided, no precise method of setting and maintaining a specific height offset has been disclosed. Even in the case of electro-optic sensors that monitor height above a row of plants, no fine adjustment for specific growing and plant conditions in a given field is provided.

These prior art devices do not provide the machine operator an efficient means of setting and maintaining the cutting height. What is needed is a simple to use device that provides an indication of relative cutting height so that adjustments can be easily made with visual feedback to the operator. Further, by having an easy to read visual measurement device, the operator can easily and safely make periodic adjustments to the height based on guidance from personnel on the ground, such as an area supervisor, who is able to inspect the cut depth on an actual plant and signal corrections to the machine operator.

BRIEF SUMMARY OF THE INVENTION

According to the present invention there is provided an improved means of monitoring the height of cutters and tassel pullers on corn crop production machines. While the various prior art devices have provided for means of adjusting the height, none disclose a basic visual measurement gauge that allows the operator to set and monitor the height of the apparatus and to also make measured relative adjustments to the height.

The present invention provides a novel device that can be retrofit on existing corn crop production machines and provides an efficient and easy to use means of making measured height adjustments.

The unique innovation of the cut sight gauge is that the measuring and set up is performed from the safety of the operator's platform or cab. The contact to the machine by the ground personnel is eliminated.

The setup of the machine is accomplished in the matter of traveling a short distance at the beginning of each field. The area supervisor can determine the proper height from behind the machine at a safe distance and can signal the operator to adjust the cut sight to the optimum height required. Once the cut sight gauge is set the operator can maintain the specified uniform height at all times during the operating period.

The cut sight gauge is used in the cutting as well as the subsequent pulling process of tassels in all corn production applications.

The design of the cut sight gauge takes into account the concerns for plant health as well as the safety of personnel. The product has been tested over thousands of acres and has met with approval on many levels in the seed industry.

The cut sight gauge system can be installed in about two hours without special tools, and common hardware is all that is needed for installation.

The present invention achieves its intended purposes, objects, and advantages through a new, useful and unobvious combination of component elements and methods, with the use of a minimum number of functioning parts, at a reasonable cost to manufacture, and by employing only readily available materials.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention illustrated by the accompanying drawings.

BRIEF DESCRIPTION OF THE DRAWINGS

The foregoing and other objects, features and advantages of the invention will become more fully understood from the following description of the preferred embodiments of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

Figure 1:
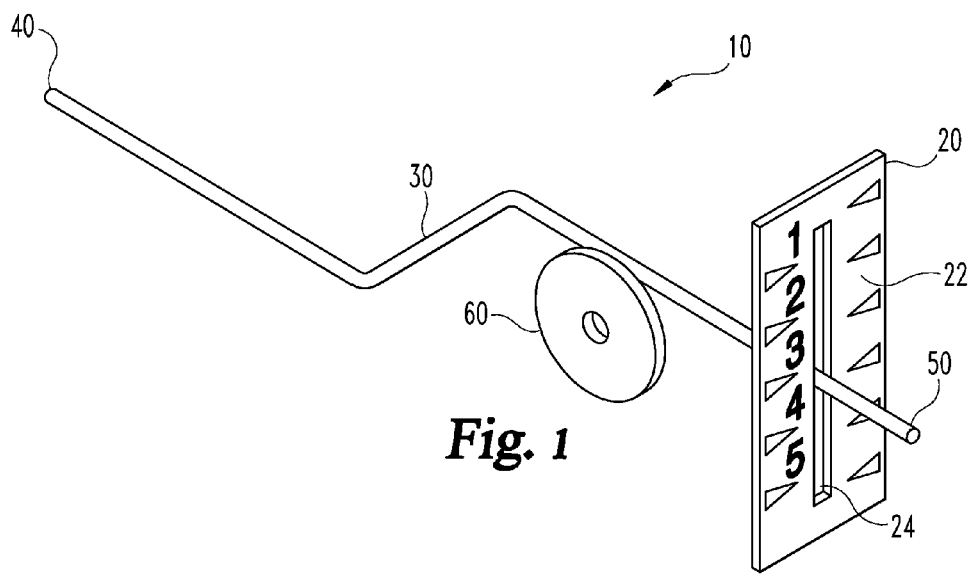
FIG. 1 is a perspective view of the cut sight gauge assembly in accordance with the present version of the invention.

The following table lists the drawing reference numerals with a brief description of each identifying numeral.

| | |
|---|---|
| 10 | Cut sight gauge assembly |
| 20 | Numbered face plate, slotted |
| 22 | Front of numbered face plate |
| 24 | Slot in numbered face plate |
| 26 | Numbered face plate, alternate |
| 28 | Attachment assembly for face plate |
| 30 | Pointer rod |
| 40 | Forward tail of pointer rod |
| 50 | Indicator tip of pointer rod |
| 60 | Pointer rod attachment assembly |
| 100 | Vertical head tool bar |
| 104 | Front upper hinge |
| 110 | Pointer hinge attachment |
| 120 | Sensor mount bar actuator |
| 130 | Sensor mount bar |
| 140 | Main lift cylinder |
| 142 | Rear vertical bar |
| 144 | Rear lower bar hinge |
| 146 | Rear upper bar hinge |
| 150 | Upper bar |
| 152 | Lower bar |
| 200 | Cutting arm assembly |
| 210 | Cutting blade |
| 240 | Sensor mount |
| 250 | Sensor |
| 300 | Corn stalk |
| 305 | Top of uncut plant |
| 310 | Top of cut plant |

DETAILED DESCRIPTION OF THE INVENTION

Referring now to the drawings and in particular to FIG. 1, wherein there is illustrated the cut sight gauge assembly 10, a detailed description of the invention is provided herein.

Shown in FIG. 1 is the cut sight gauge assembly 10 that includes a numbered face plate 20 and a pointer rod 30. In one embodiment of the numbered face plate 20, there is a front 22 and a slot 24. The pointer rod 30 has a forward tail 40, an indicator tip 50 and an attachment assembly 60, where in FIG. 1 the attachment assembly 60 is shown as a washer that is fixedly attached to the pointer rod 30. The indicator tip 50 is aligned to move along the length of the numbered face plate 20 so that the location of the indicator tip 50 relative to the numbered face plate 20 provides a measurement indicator of the position of the sensor mount bar 130, shown in FIGS. 5, 6 and 7. As shown in FIG. 1, the front 22 of the numbered face plate 20 may be marked by numbers and gradations. In one embodiment of the numbered face plate 20, a slot 24 is included through which the indicator tip 50 protrudes for indicating the cutting height measurement.

Figure 2:
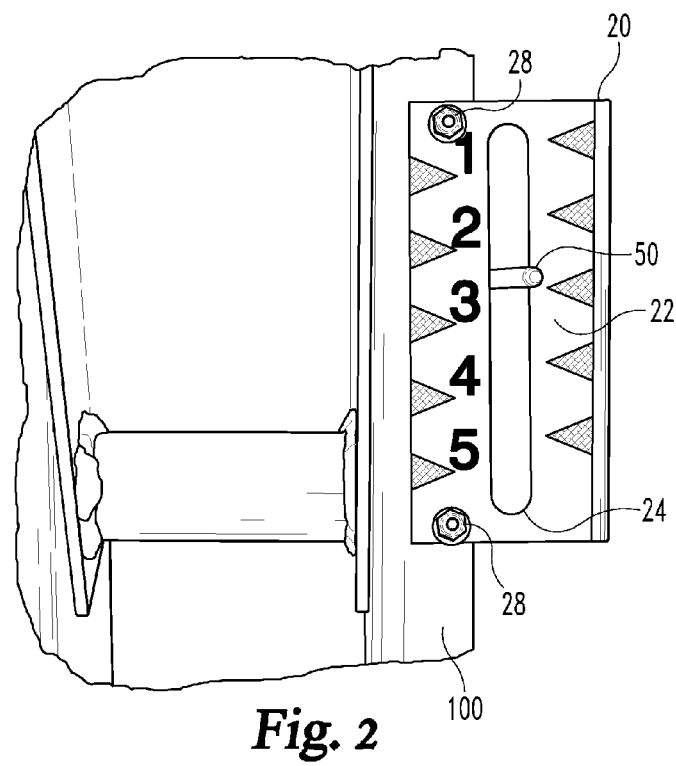
FIG. 2 is a front view of the cut sight gauge assembly as installed and showing the front of the numbered face plate.

Referring now to FIG. 2, the face plate 20 is attached to the vertical head tool bar 100 to provide a measurement indication for the pointer rod indicator tip 50. The face plate 20 is attached to the vertical head tool bar 100 with any of a number of attachment means such as with an adhesive, clamp or other fastener. In FIG. 2, the attachment assembly 28 is shown as a nut and bolt assembly that attaches the face plate 20 to the vertical head bar tool 100. It is clear that any number of attachment means could be utilized.

Figure 3:
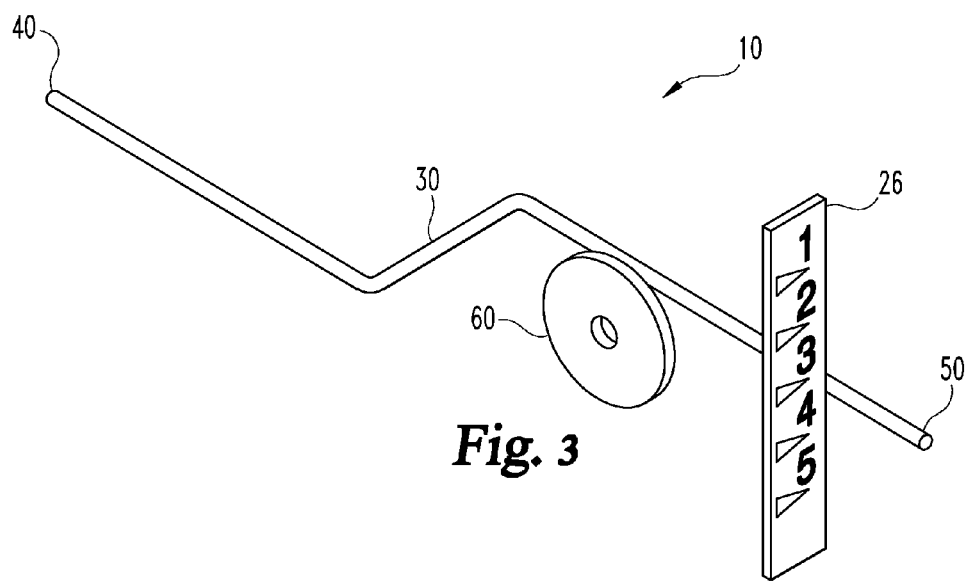
FIG. 3 is a perspective view of the cut sight gauge assembly in accordance with the present version of the invention with an alternate version of the face plate that does not have a slot.
Figure 4:
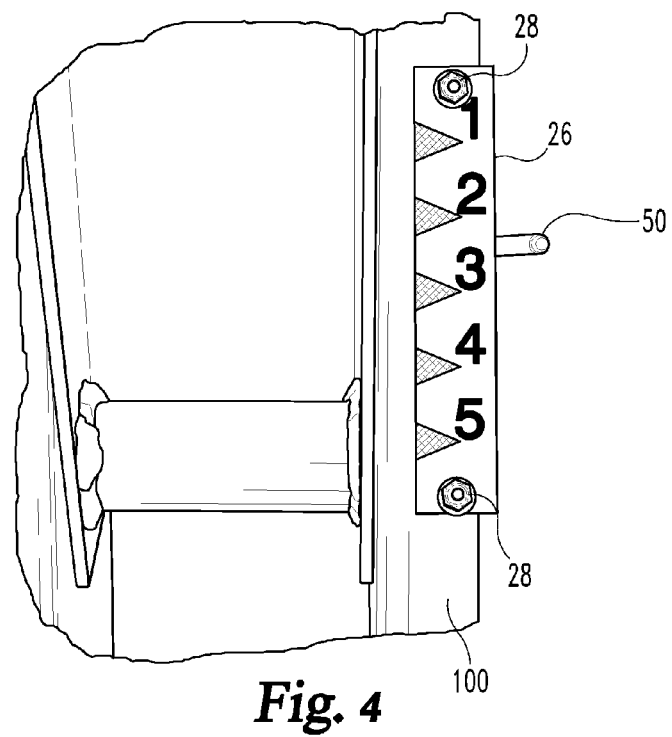
FIG. 4 is a front view of the cut sight gauge assembly as installed and showing the front of the numbered face plate with an alternate version of the face plate that does not have a slot.

Referring now to FIG. 3 and FIG. 4, an alternate face plate 26 is shown where the pointer rod indicator tip 50 is aligned along the side of the alternate face plate 26 rather than protruding through a slot 24 as shown in FIG. 1 and FIG. 2. It should be clear that the implementation of the numbered face plate 20 can be accomplished in a number of equivalent forms that provide the functionality defined by the present invention. Any means of applying metered markings for relative positioning of the pointer rod indicator tip 50 will serve the purpose, and may be accomplished, for instance, with a decal or sticker applied to the vertical head tool bar 100.

Figure 5:
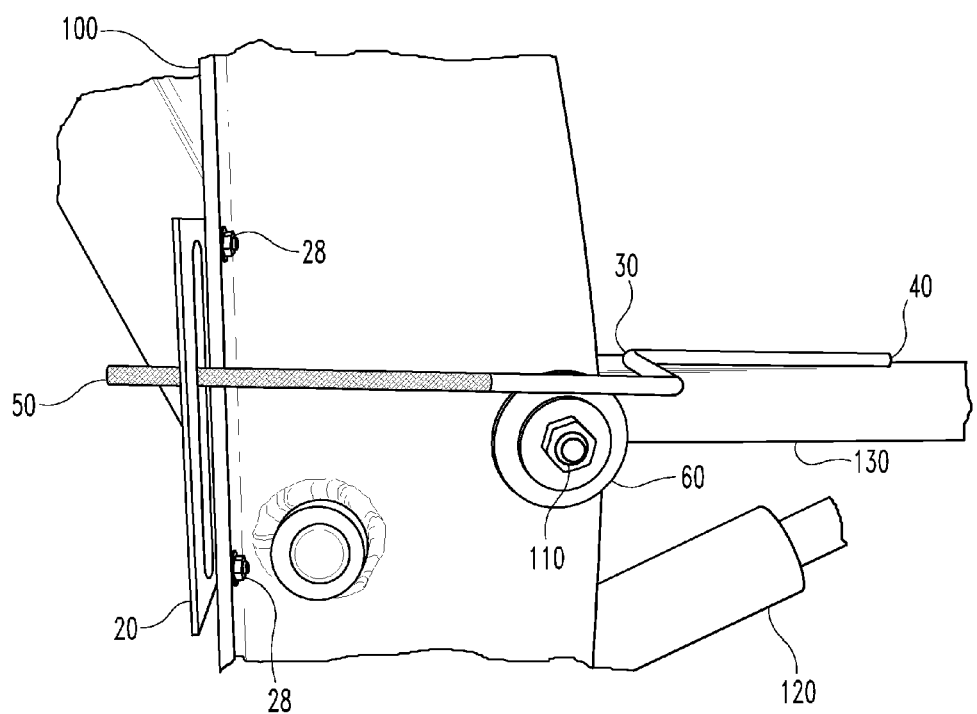
FIG. 5 is a side view of the cut sight gauge assembly as installed.

Referring now to FIG. 5, the positioning of the pointer rod 30 on the corn crop production machine will be made more apparent. As shown in FIG. 5, the forward tail of the pointer rod 40 is aligned with and attached to the sensor mount bar 130. The forward tail of the pointer rod 40 may be attached to the sensor mount bar 130 by any typical means, including using banding straps, clamps, adhesive, screw or bolt fasteners or by welding, for example. The pointer rod attachment pivot point 60 is attached with a pointer hinge attachment 110 to the vertical head tool bar 100 so that as the angle of the sensor mount bar 130 changes, the position of the pointer rod indicator tip 50 moves up and down relative to the numbered face plate 20.

Figure 6:
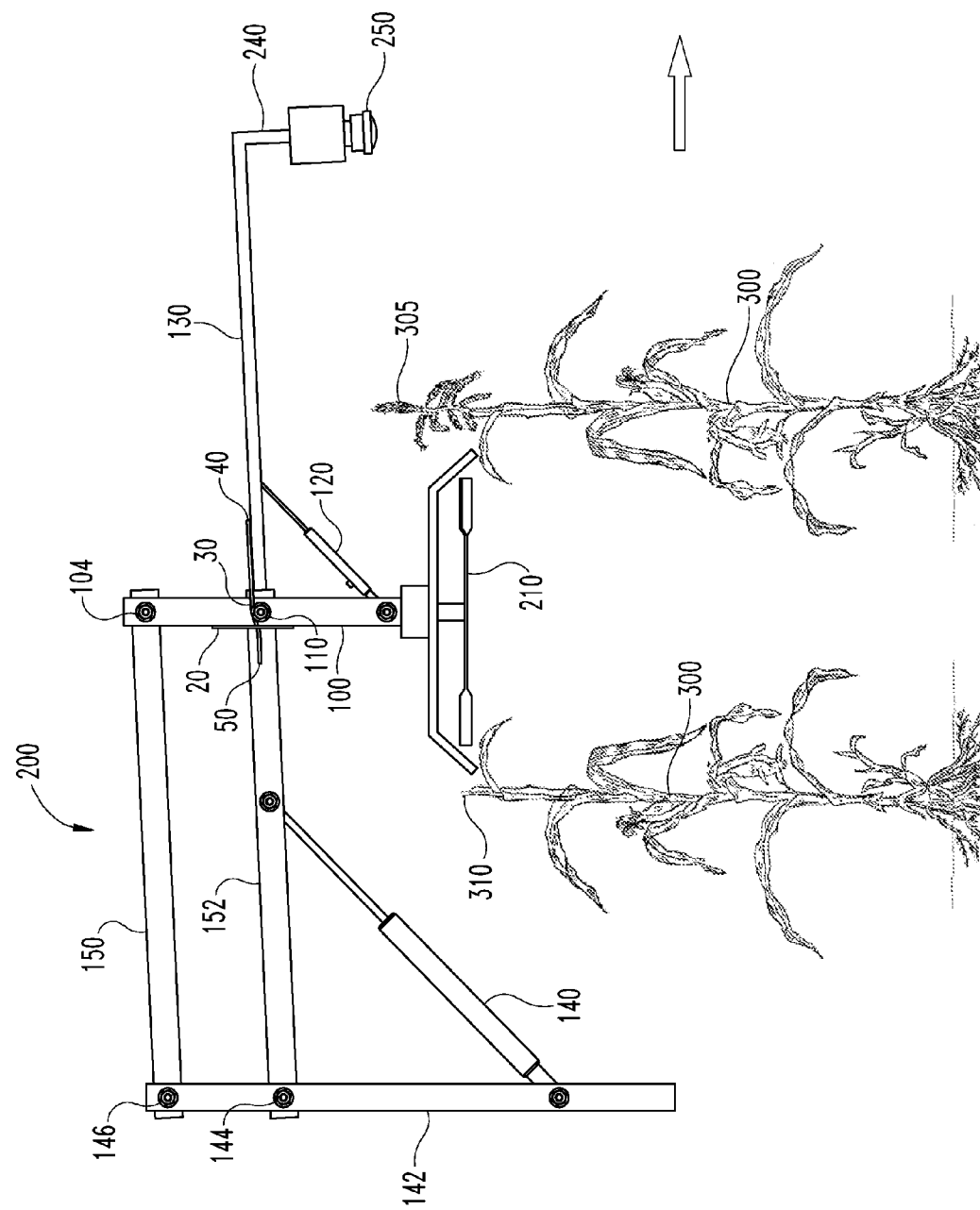
FIG. 6 is a side view of a cutting arm assembly showing the attachment location of the cut sight gauge.

To further describe the functionality of the corn crop production machine used for detasseling operations and the improvement in operation provided by the cut sight gauge assembly 10, refer now to FIG. 6. In FIG. 6 is shown a complete cutting arm assembly 200 of a detasseling machine. The cutting arm assembly 200 is designed to position a device such as a cutting blade 210 or a tassel puller at the correct height for purposes of cutting the top of an uncut plant 305 or pulling the tassel from the top of a corn stalk 300. After the cutting operation, the top of the cut plant 310 is desired to be uniform across the field of plants. In a cutting operation, the depth of the cut from the top of the plant is critical for the health of the plant, so a means of positioning the cutting blade 210 is required.

In a typical cutting/detasseling machine, several interconnecting vertical bars and horizontal arms are hinged together with hydraulic actuators to control the angle of the horizontal arms. As shown in FIG. 6, a rear vertical bar 142 forms the main structural connection to the cutting/detasseling machine. Two horizontal bars, the upper bar 150 and the lower bar 152, are connected to the rear vertical bar 142 and extend forward to support the vertical head tool bar 100 and the sensor mount bar 130. The back end of the upper bar 150 is attached to the top of the vertical head tool bar 100 by a rear upper bar hinge 146 connection. The back end of the lower bar 152 is attached to the vertical head tool bar 100 below the upper bar 150 by a rear lower bar hinge 144 connection.

The top of the vertical head tool bar 100 is connected to the front end of the upper bar 150 by a hinged joint, the front upper hinge 104. The middle of the vertical head tool bar 100 is connected to the lower bar 152 by a hinged joint at the pointer hinge attachment 110.

The top of the vertical head tool bar 100 is connected to the front end of the upper bar 150 by a hinged joint, the front upper hinge 104. The middle of the vertical head tool bar 100 is connected to the lower bar 152 by a hinged joint at the pointer hinge attachment 110. At the bottom of the vertical head tool bar 100 is mounted a tool head, such as a cutting blade 210 or alternatively a tassel puller assembly. Extending forward of the vertical head tool bar 100 is a sensor mount bar 130. At the front end of the sensor mount bar 130 is a sensor mount 240 which further supports a sensor 250, such as an electro-optic sensor for detecting the level of the tops of plants.

Two means of height adjustment are provided that allow the operator to adjust the height of the cutting blade 210 relative to the rear vertical bar 142 as well as a means to adjust the height of the sensor 250 relative to the height of the cutting blade 210. A first height adjustment is provided by a main lift cylinder 140 that is connected between the rear vertical bar 142 and the lower bar 152 and that provides a hydraulic means of adjusting the height of the lower bar 152. By changing the height of the lower bar 152, the height of the cutting blade 210, or alternatively a tassel puller, is adjusted, as well as the height of the sensor mount bar 130 that extends forward of the vertical tool bar 100. A second height adjustment is provided by a sensor mount bar actuator 120 that is connected between the vertical head tool bar 100 and the sensor mount bar 130 and that provides a hydraulic means of adjusting the height of the sensor mount bar 130 relative to the vertical tool bar 100. The sensor 250 is used to detect the height of the plant, such as a corn stalk 300, and maintains the height of the cutting arm assembly 200 at a designated height by controlling the main lift cylinder 140.

Also shown in FIG. 6 is the pointer rod 30 having the forward tail 40 attached to the sensor mount bar 130 so that the relative movement of the sensor mount bar 130 results in a corresponding movement of the pointer rod 30. The pointer rod 30 is attached to the vertical head bar 100 at a pointer hinge attachment 110 so that the indicator tip 50 moves upward when the forward tail 40 attached to the sensor mount bar 130 moves downward. The numbered face plate 20 is attached to the vertical tool bar 100 so that the full range of vertical motion of the indicator tip 50 is measurable by a scale imprinted on the numbered face plate 20.

Nominally, the front 22 of the numbered face plate 20 is printed with a numbered scale that may correspond, for example, to a relative height in inches or other linear scale. Other scales may be used, including any simple markings that signify desired height settings. For example, there may be a marker to indicate an optimal cutting height and another marker to indicate an optimal tassel pulling height. The primary objective is to provide the operator with a visual and repeatable indicator of relative height of the cutting blade 210 and the sensor 250.

Figure 7:
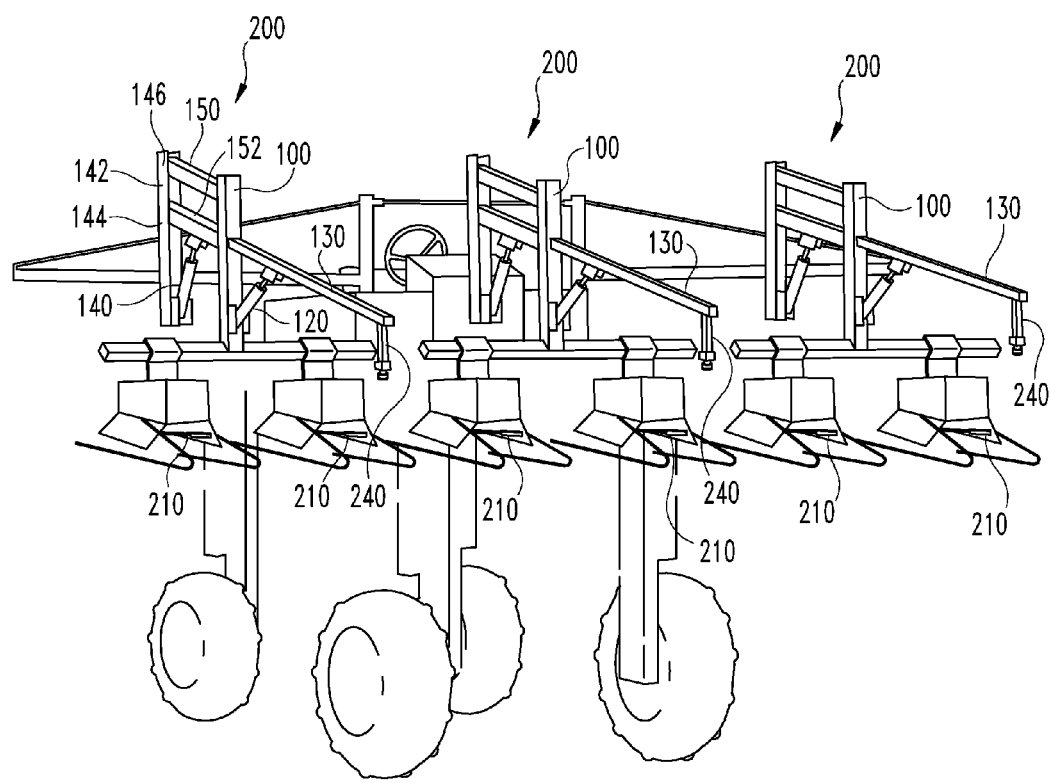
FIG. 7 is a perspective view showing an array of cutting arm assemblies in a typical implementation.

In FIG. 7, an array of cutting arm assemblies 200 are shown as they are typically implemented on a commercial cutting/detasseling machine. As shown in FIG. 7, there are two cutting blades 210 attached to each cutting arm assembly 200. Three cutting arm assemblies 200 are shown in FIG. 7 and provide cutting/detasseling operations on six rows of plants simultaneously, and the height of the cutting blades 210 on each cutting arm assembly 200 is independently controlled relative to the sensor 250 on each cutting arm assembly 200. A cut sight gauge assembly 10 is attached to each cutting arm assembly 200 at the vertical head tool bar 100. The number of cutting arm assemblies 200 may vary depending on the specific manufacture.

When the machine is moved into the field and is in proper alignment with the rows to be cut/pulled, the operator activates the sensors 250, such as photo cells, by way of an electrical switch for each of the row units (typically six row/units). This lets the photo cells find the tops of the plants. Once the photo cells find the plant, the sensor mount bar actuator 120 is activated up or down by way of a toggle switch from inside of the cab by the operator. This sets the height of the photo cells and the prescribed cutting height.

Once the proper height of cut is determined, the cut sight gauge reading is noted. At all times during the operation the proper height of cut can be maintained on each unit by sight. The cut sight gauge face plate 20 is mounted just above the sensor mount bar actuator 120 on the vertical head tool bar 100 on the back side with the numbers facing the operator. The pointer indicator tip 50 on the cut sight gauge moves through the slot 24 in the numbered face plate 20.

The photo cell reads the height of the plant and signals the main cylinder to raise or lower the cutting head to adjust to the pre-determined cut height. That cutting height is monitored by the cut sight gauge (one on each of the cutting units).

The height of the plants, the roughness of the ground and ground speed (as much as 7 mph) will cause the sensor to continuously adjust the main lift cylinder 140 to maintain uniform cut height. Each cutting unit is operated independently from each other. The roughness of the travel through the field causes the actuator 120 to bounce and get out of adjustment causing an uneven cut. The purpose of the cut sight gauge is to monitor and make those adjustments as needed traveling through the field to maintain the prescribed cut.

Once the cutting height is determined the operator looks at the cut sight gauge numbered face place 20 and notes the setting and maintains that setting for the duration of that specific field. This procedure is followed at the start of each field or by the direction of the area field manager. Each of the actuators 120 are set individually to reflect the same number setting on the cut sight gauge face plate 20 to give all of the plants in the field the same uniform treatment.

The sensors 250, such as photo cells, will always find the plants once they are turned on by the operator and only move up or down the main lift cylinder 140. For example—if the photo cell is set to have the cutter/puller cut or pull the top 2 inches of the plant and the plants are six feet tall, then in the same row the plants drop in height to 4 feet, the photo cell controls the main lift cylinder 140 to drop the cutting assembly down to cut only the 2 inches from the top of the plant, because the sensor mount bar actuator 120 has the photo cell distance set in relationship to any variation in plant height. The cut sight gauge tells visually what that setting is. The sensor mount bar actuator 120 sometimes drifts out of adjustment therefore making the photo cell out of adjustment by the constant movement of the main lift cylinder 140 up and down and the rough ground conditions. The sensor mount bar actuator 120 is to maintain the cutting height. The cut sight gauge 10 is to visually maintain the actuator 120 setting of the sensors 250 to ensure the proper cut/pull.

The cut sight gauge is used in the exact same manner in the pulling of the tassels. This process is accomplished by removing the cutter units and replacing them with units consisting of spinning rubber tires that are set to grab the tassels as they pass through.

It should be evident that the specific size and shape of each element can be modified to achieve the intent of this device.

While this version of the invention has been illustrated and described in detail in the drawings and foregoing description, the same is to be considered as illustrative and not restrictive in character, it being understood that only the preferred embodiments have been shown and described and that all changes and modifications that come within the spirit of the version of the invention are desired to be protected.

For instance, alternate versions of embodiments of the cut sight gauge can be provided with various dimensions, face plates and pivot point locations. With respect to the above description then, it is to be realized that the optimum dimensional relationships for the parts of the invention, to include variations in sizes, lengths, diameters, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved method of setting and monitoring the cutting height in detasseling operations has been provided.

Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A cut sight gauge assembly for an agricultural machine used for corn crop cutting and detasseling comprising:

a pointer rod having a forward tail end, a pointer rod attachment assembly, and a distal indicator tip; where the agricultural machine has a cutting arm assembly, and where the cutting arm assembly is comprised of a vertical head tool bar that can be raised or lowered relative to the agricultural machine, a tool head connected to the bottom of the vertical head tool bar, a pointer hinge attachment location on the vertical head tool bar above the tool head, a sensor mount bar rotatably connected to the vertical head tool bar at the pointer hinge attachment location and extending forward of the vertical head tool bar, and a sensor attached to the forward distal end of the sensor mount bar; and where the tail end of the pointer rod is fixidly attached to the sensor mount bar, and the pointer rod attachment assembly is rotatably attached to the pointer hinge attachment location;

a scaled face plate attached to the vertical tool head bar, where the indicator tip of the pointer rod is juxtaposed to and moves vertically in relation to the scaled face plate as the sensor mount bar rotates.

2. The cut sight gauge according to claim 1, where the scaled face plate is further comprised of a scaled front.

3. The cut sight gauge according to claim 1, where the scaled face plate is further comprised of a scaled front and a slot, where the indicator tip extends through the slot.

4. The cut sight gauge according to claim 1, where the tool head is comprised of a cutting blade.

5. The cut sight gauge according to claim 1, where the tool head is comprised of a tassel puller.

\* \* \* \* \*